United States Patent
MacInnis

(10) Patent No.: US 7,610,603 B2
(45) Date of Patent: Oct. 27, 2009

(54) MULTISTREAM VIDEO COMMUNICATION WITH STAGGERED ACCESS POINTS

(75) Inventor: Alexander G. MacInnis, Lake Oswego, OR (US)

(73) Assignee: Broadcom Corporation, Irvine, CA (US)

( * ) Notice: Subject to any disclaimer, the term of this patent is extended or adjusted under 35 U.S.C. 154(b) by 728 days.

(21) Appl. No.: 11/038,728

(22) Filed: Jan. 20, 2005

(65) Prior Publication Data

US 2005/0216950 A1 Sep. 29, 2005

Related U.S. Application Data

(60) Provisional application No. 60/556,667, filed on Mar. 26, 2004.

(51) Int. Cl.
*H04N 7/173* (2006.01)
(52) U.S. Cl. .................. 725/90; 725/101; 709/231; 709/246
(58) Field of Classification Search ............. 725/90, 725/97–103; 709/231, 246
See application file for complete search history.

(56) References Cited

U.S. PATENT DOCUMENTS 5,594,491 A * 1/1997 Hodge et al. ................ 725/103
2006/0095946 A1 * 5/2006 Gardes ....................... 725/97
2006/0140276 A1 * 6/2006 Boyce et al. ............ 375/240.21

* cited by examiner

*Primary Examiner*—Scott Beliveau
*Assistant Examiner*—Nicholas T Corbo
(74) *Attorney, Agent, or Firm*—McAndrews, Held & Malloy, Ltd.

(57) ABSTRACT

A system and method that provide reduced latency in a video signal processing system. Various aspects of the present invention may comprise transmitting a first video information stream representative of a unit of video information. For example, the transmitted first video information stream may correspond to a video channel. A second video information stream representative of the unit of video information may be transmitted simultaneously with the first video information stream. The second video information stream may also, for example, correspond to the video channel. Various aspects of the present invention may comprise receiving a plurality of simultaneously transmitted video information streams. A video information stream of the plurality of received video information streams may be identified that, when processed, is expected to result in the lowest latency in presenting the unit of video information to the user. The identified video information stream may then be so processed.

28 Claims, 4 Drawing Sheets

US 7,610,603 B2

MULTISTREAM VIDEO COMMUNICATION WITH STAGGERED ACCESS POINTS

CROSS-REFERENCE TO RELATED APPLICATIONS/INCORPORATION BY REFERENCE

This patent application claims the benefit of U.S. Provisional Application No. 60/556,667 filed Mar. 26, 2004, the contents of which are hereby incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

In various digital video systems, there is a latency time between when a user makes a request for particular video information and when the system presents the requested video information to the user. For example and without limitation, a user may specify a viewing channel corresponding to video information that the user is interested in viewing. Further for example, a user may select a video information title from a menu, a user may enter a channel up/down request, or a user may sequence through a list of favorite video channels.

There will generally be a latency time between when the user requests video information and when the system presents the requested video information to the user. There may be any of a large variety of causes for such latency. Such causes may comprise, without limitation, request processing delays, information communication delays and information processing delays. In general, users prefer that the latency time between a video information request and presentation of the requested video information to the user be minimized.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Various aspects of the present invention provide a system and method that provide reduced latency in a video signal processing system. Various aspects of the present invention may comprise transmitting a first video information stream representative of a unit of video information. The transmitted first video information stream may, for example, correspond to a video channel. A video transmitter may, for example, perform such transmitting.

A second video information stream representative of the unit of video information may be transmitted simultaneously with the first video information stream. The transmitted second video information stream may also, for example, correspond to the video channel. A video transmitter may, for example, perform such transmitting The second video information stream may, for example, comprise a time delayed version of the first video information stream. A time delay module may be utilized to form such a time delayed version. The second video information stream may also, for example, be generated from the unit of information independently of the first video information stream. An encoder module may, for example, perform such generation. For example, the first video information stream may comprise a first encoded version of the unit of information, and the second video information stream may comprise a second encoded version of the unit of information. The first and second encoded versions may, for example, be formed using identical or different encoding techniques. The first and second encoded versions may, for example, be encoded at identical or different quality levels.

The transmitted first and second video information streams may each comprise respective sets of access points. For example, the transmitted first and second video information streams may be generally temporally aligned, and the respective access points of the temporally aligned transmitted information streams may be generally temporally displaced.

Various aspects of the present invention may comprise receiving a request for a unit of video information. Such a request may, for example, originate from a user that desired to view the unit of video information. Such a request may also, for example, originate from a device automatically. Such a request may, for example and without limitation, comprise a channel change request.

A plurality of video information streams that are representative of the requested unit of information may be received. Such reception may, for example, occur simultaneously. A video receiver module may, for example, perform such receiving. The plurality of video information streams may, for example and without limitation, correspond to the same video channel.

A video information stream of the received plurality of video information streams may be identified that, when processed, is expected to result in the lowest latency in presenting the requested unit of video information. A processor module may perform such a stream identification. The lowest latency video information stream may, for example, be identified according to predicted or observed time of arrival of respective access points in the received plurality of video information streams.

The identified video information stream may then be processed to present the unit of video information. A processor module may perform such processing. The processing may, for example, generate a video display driver signal, which may be provided to a display device. The display device may then, for example, present the requested unit of video information in human-perceivable form.

These and other advantages, aspects and novel features of the present invention, as well as details of illustrative aspects thereof, will be more fully understood from the following description and drawings.

DETAILED DESCRIPTION OF THE INVENTION

Figure 1:
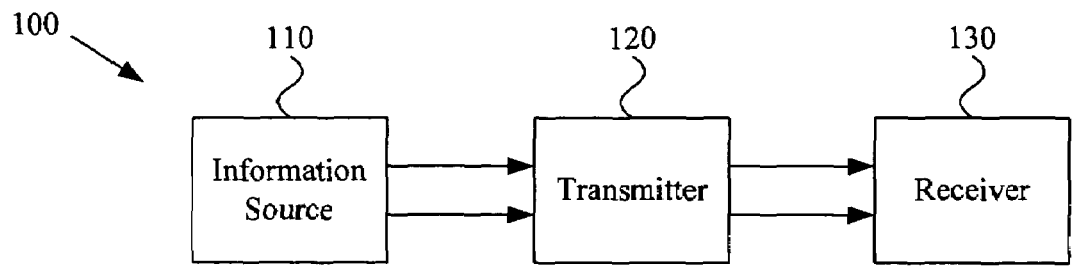
FIG. 1 is a diagram showing an exemplary video communication system that provides reduced latency, in accordance with various aspects of the present invention.

FIG. 1 is a diagram showing an exemplary video communication system 100 that provides reduced latency, in accordance with various aspects of the present invention. The exemplary video communication system 100 may comprise an information source 110, a transmitter 120 and a receiver 130. Various aspects of the information source 110, transmitter 120 and receiver 130 will be discussed in more detail later.

The exemplary video information source 110 may, for example, provide a first video information stream representative of a unit of video information. The first video information stream may, for example and without limitation, comprise a serial stream of video-related data. For example, a serial stream may comprise video data that has been encoded according to a block encoding standard (e.g., MPEG-2, MPEG-4, MPEG-4 AVC, etc.). Also, for example, a serial stream may comprise video data that has not been encoded according to a block encoding standard (e.g., digitized chroma and luma information). Accordingly, the scope of various aspects of the present invention should not be limited by characteristics of a particular type of video information or a particular type of video information stream.

The unit of video information may comprise any of a large variety of types of units of video information. For example and without limitation, the unit of video information may comprise information of a television program, a movie, a music video, kinetic video art, a video commercial, a teleconference, etc. A unit of video information may, for example, be requested by a user or may be communicated automatically. A unit of video information may, for example, be unicast, multicast or broadcast. Accordingly, the scope of various aspects of the present invention should not be limited by characteristics of a particular unit of video information.

The exemplary video information source 110 may also, for example, provide a second video information stream representative of the unit of video information (i.e., the same unit of video information that the first video information stream is representative of). As will be discussed in more detail later, the second video information stream may share various characteristics with the first video information stream. For example and without limitation, the second video information stream may correspond to a time-shifted version of the first video information stream.

Also for example, the first and second video information streams may be formed by encoding the unit of video information according to different respective encoding methods. For example, the first and second video information streams may be encoded to provide temporally staggered (or alternating) access points when the first and second video information streams are temporally synchronized overall. Alternatively for example, the first and second video information streams may be encoded to provide different respective numbers of access points. Such different respective encodings may comprise encoding the unit of video information to generally identical respective quality levels or generally different respective quality levels.

For this discussion, an access point may be generally considered to be a point at which decoding (or further processing) of a video stream may conveniently begin. For example and without limitation, decoding (or otherwise processing) an access point might require a minimal amount of video information communicated prior to the access point. In a non-limiting example, various block-encoding schemes may utilize inter-coded and intra-coded frames for communicating video information, where intra-coded frames may generally be decoded (or otherwise processed) with no (or minimal) knowledge of information from previously communicated video frames, and inter-coded frames are generally decoded (or otherwise processed) utilizing information from previously communicated video frames. Such an intra-coded frame may provide a non-limiting example of an access point.

In general, the first and second video information streams are each representative of the unit of video information. Accordingly, the scope of various aspects of the present invention should not be limited by characteristics of particular encoding and/or time-shifting methods, or by characteristics of particular access points.

The exemplary video information source 110 may comprise any of a large variety of video information source characteristics. For example and without limitation, the video information source 110 may comprise a transmitter of a live video broadcast or a database of video information. The exemplary video information source 110 may be located in any of a large variety of geographical locations. For example and without limitation, the video information source 110 may be co-located with the transmitter 120. Also for example, the video information source 110 may be communicatively coupled with the transmitter 120 through a communication network. In such a scenario, the video information source 110 may comprise characteristics of a head-end communication node or an intermediary communication node.

Such a communication network may, for example, be based on any of a large variety of communication media (e.g., wired, wireless RF, tethered optical, non-tethered optical, etc.). Such a communication network may, for example, comprise a television network, computer network, radio network, telephone network, etc. Communication over the communication network may utilize any of a large variety of communication protocols (e.g., television protocols, telephone protocols, data communication protocols, audio protocols, etc.).

Note that the following discussion will generally address two video information streams. However, it is stressed that the following discussion discusses two video information streams for illustrative purposes, and that various aspects of the present invention are readily extensible beyond two video information streams to N video information streams, where N is a number greater than one.

In general, the video information source 110 may comprise any of a large variety of video information source characteristics. Accordingly, the scope of various aspects of the present invention should not be limited by characteristics of a particular video information source.

The exemplary transmitter 120 may receive the first video information stream from the video information source 110, and may also receive the second video information stream from the video information source 110. The exemplary transmitter 120 may transmit the first video information stream.

The transmitter 120 may, for example, transmit the first video information stream in a manner in which the first video information stream will correspond to a video channel (e.g., a television channel, video program or other video communication channel).

The exemplary transmitter 120 may also transmit the second video information stream simultaneously with the first video information stream. For example, the transmitter 120 may transmit the second video information stream in a manner in which the second video information stream will correspond to the same video channel to which the first video information stream corresponds.

In an exemplary television scenario, the transmitter 120 may transmit the first and second video information streams in a manner in which both the first and second video information streams correspond to television channel M. The transmitter 120 may, for example, transmit the first and second video information streams in this manner, even though the first and second video information streams may each comprise information of the same unit of video information.

The exemplary transmitter 120 may transmit the first and second video information streams such that the first and second video information streams are substantially temporally aligned. For example and without limitation, the transmitted first and second video information streams may be temporally aligned to within one-to-two seconds (or one-to-two minutes). In a non-limiting exemplary scenario, where the second video information stream comprises a time-shifted version of the first video information stream, the transmitted first and second video information streams may be temporally aligned to less than the average time between access points in the first video information stream.

As mentioned previously, the first and second video information streams may each comprise respective access points. The exemplary transmitter 120 may transmit the first and second video information streams such that access points of the transmitted first video information stream are generally temporally displaced from access points of the transmitted second video information stream. For example and without limitation, access points of the transmitted first video information stream may be generally temporally staggered (or alternated) with access points of the transmitted second video information stream. Note, however, that since access points within a video information stream may have variable temporal spacing, access points of the transmitted first and second video streams may be generally temporally displaced, while a portion of the access points may also be temporally aligned.

Also for example, such temporal displacement or staggering of access points need not be perfectly symmetrical. For example, in an exemplary scenario where the first and second video information streams have different respective numbers of access points, the access points of the transmitted streams may be temporally staggered (or alternated) asymmetrically. That is, an access point of the transmitted first video information stream may be transmitted, followed by one, two, or P access points of the transmitted second video information stream, and then followed by the next access point of the first video information stream.

In general, the transmitter 120 may transmit the first and second video information streams simultaneously and corresponding to the same video channel. Accordingly, the scope of various aspects of the present invention should not be limited by characteristics of a particular temporal relationship between the transmitted video information streams or by a particular temporal relationship between access points of the transmitted video information streams.

The exemplary transmitter 120 may, for example, transmit the first and second video information streams over any of a variety of communication network types, utilizing any of a variety of communication media, utilizing any of a variety of modulation techniques and utilizing any of a variety of communication protocols. For example, the transmitter 120 may transmit the first and second video information streams over a television network, radio network, telephone network, computer network, etc. The transmitter 120 may, for example, transmit the first and second video information streams over wired, wireless or optical communication media. The transmitter 120 may, for example, transmit the first and second video information streams utilizing a television protocol, telephone protocol, data communication protocol, audio protocol, etc.

In an exemplary television scenario, the transmitter 120 may transmit the first and second video information streams over a cable or satellite television network. The exemplary transmitter 120 may, for example, transmit the first and second video information streams as components of a multi-stream communication channel (e.g., as components of a single QAM channel). Such an exemplary transmission may, for example, provide for the first and second video information streams to be more easily received using a single tuner/receiver pair.

As mentioned previously, the first and second video information streams may comprise respective access points. In an exemplary non-limiting scenario, the transmitter 120 may also transmit information of access point timing for at least one of the first and second video information streams. As discussed later, a receiver may utilize such information to determine which of the first and second video information streams will communicate the next access point.

In general, the transmitter 120 may transmit the first and second video information streams simultaneously and corresponding to the same video channel. Accordingly, the scope of various aspects of the present invention should not be limited by characteristics of a particular communication network, media, modulation technique or communication protocol.

The exemplary receiver 130 may receive video information and process at least a portion of such received video information for presentation to a user. For example and without limitation, the exemplary receiver 130 may receive a plurality of video information streams as discussed previously.

The exemplary receiver 130 may receive a request from a user (e.g., directly or through a programmed device) to present a unit of video information. The request may, for example and without limitation, comprise a video channel change request. In a non-limiting scenario, the request may comprise a television channel change request. The receiver 130 may receive such a request in any of a large variety of ways. For example, the receiver 130 may receive such a request through a variety of user interfaces or device communication interfaces.

The receiver 130 may receive a plurality of video information streams, each of which represents the requested unit of video information. For example and without limitation, the receiver 130 may receive the first and second video information streams discussed previously regarding the exemplary transmitter 120. The exemplary receiver 130 may, for example, receive the plurality of video information streams over a single multi-stream communication channel or over a plurality of communication channels.

In an exemplary scenario, the receiver 130 may also receive information of access point timing for at least one of the plurality of video information streams. Such information of access point timing may, for example and without limitation, comprise information indicating expected time of arrival for various access points in one or more of the plurality of video information streams. Such information of access point timing may, for example and without limitation, comprise information indicating which of the plurality of streams is expected to provide the next access point (i.e., the access point enabling the earliest commencement of video processing).

The receiver 130 may identify which of the plurality of video information streams, when processed, is expected to result in the lowest latency (or delay) in presenting the unit of video information. For example, in an exemplary scenario where the receiver 130 may begin processing a video information stream at the next access point, the receiver 130 may identify which of the plurality of video information streams will communicate the next access point.

The receiver 130 may identify which of the plurality of video information streams is expected to result in the lowest latency in any of a variety of ways. For example, the receiver 130 may identify access points in each of the plurality of video information streams to determine which of the plurality of video information streams communicates the next access point. Also for example, the receiver 130 may identify access points in one of the plurality of video information streams and (e.g., based on a known temporal relationship between access points in the respective plurality of video information streams) determine which of the plurality of video information streams will communicate the next access point. Alternatively, for example, the receiver 130 may receive information of access point timing and analyze such information to determine which of the plurality of video information streams will communicate the next access point.

In general, the receiver 130 may identify which of the received plurality of video information streams, when processed, is expected to result in the lowest latency in presenting the unit of video information. Accordingly, the scope of various aspects of the present invention should not be limited by characteristics of a particular way of identifying the lowest latency video information stream.

The receiver 130 may process the identified video information stream to present the unit of video information (e.g., to a user). The receiver 130 may, for example and without limitation, decode the identified video information stream. The receiver 130 may, for example, convert the identified video information stream to a display driver signal, which the receiver 130 may utilize to drive a display device that is coupled to the receiver 130. The receiver 130 may also, for example, perform conditional access processing related to the identified video information stream. In general, the receiver 130 may process the identified video information stream to present the unit of video information. Accordingly, the scope of various aspects of the present invention should not be limited by characteristics of particular processing activities performed with video information to present such information to a user.

The receiver 130 may also process a second video information stream. In a non-limiting exemplary scenario in which the second video information stream comprises higher quality video information than the previously identified (or "first") video information stream, the receiver 130 may begin processing the second video information stream concurrently with processing the first video information stream. The receiver 130 may cease processing the first video information stream after the receiver 130 has begun processing the second video information stream. Alternatively, for example, the receiver 130 may begin processing the second video information stream after commencing processing of the first video information stream without processing the two streams concurrently. For example, the receiver 130 might process first one stream and then another stream if the second stream is expected to result in higher quality video display.

The previous discussion regarding the exemplary system 100 illustrated in FIG. 1 describes various aspects of the exemplary system. The following discussion will discuss various methods that components of the exemplary system 100 might perform and various components that the exemplary system 100 might comprise. Accordingly, the scope of various aspects of the present invention should not be limited to aspects of the exemplary system 100 as previously discussed.

Figure 2:
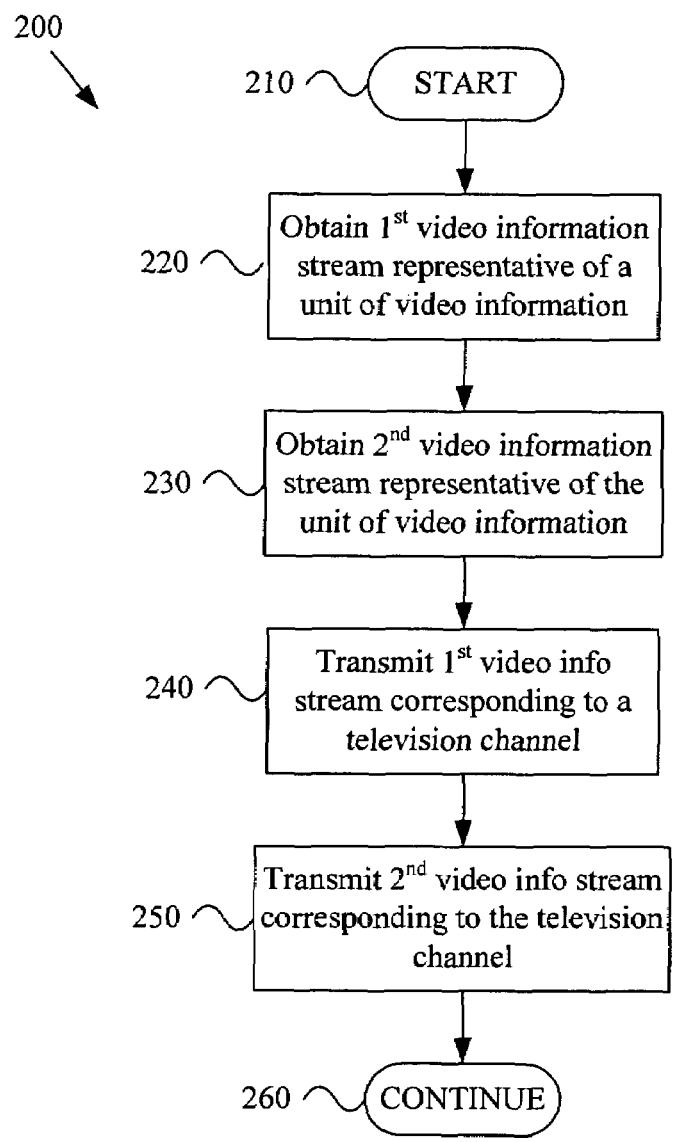
FIG. 2 is a flow diagram illustrating an exemplary method for providing reduced latency in a video transmission system, in accordance with various aspects of the present invention.

FIG. 2 is a flow diagram illustrating an exemplary method 200 for providing reduced latency in a video transmission system, in accordance with various aspects of the present invention. The exemplary method 200 may, for example and without limitation, be performed by various components of the exemplary system 100 (e.g., the information source 110 and/or the transmitter 120) illustrated in FIG. 1 and discussed previously.

The exemplary method 200 may begin at step 210 in response to any of a large variety of causes and conditions. For example and without limitation, in an exemplary video signal-processing scenario, the method 200 may begin when a television transmission system implementing the method 200 receives a request for a unit of video information. Alternatively, for example, the method 200 may begin when a transmission system implementing the method 200 is powered up or initialized. Accordingly, the scope of various aspects of the present invention should not be limited by characteristics of any particular initiating events or conditions.

The exemplary method 200 may, at step 220, comprise obtaining a first video information stream representative of a unit of video information. Step 220 may, for example and without limitation, comprise obtaining the first video information stream from an information source (e.g., an information source as discussed previously with regard to the information source 110 illustrated in FIG. 1).

The first video information stream may, for example and without limitation, comprise a serial stream of video-related data. For example, a serial stream may comprise video data that has been encoded according to a block encoding standard (e.g., MPEG-2, MPEG-4, MPEG-4 AVC, etc.). Also, for example, a serial stream may comprise video data that has not been encoded according to a block encoding standard (e.g., digitized chroma and luma information). Accordingly, the scope of various aspects of the present invention should not be limited by characteristics of a particular type of video information or a particular type of video information stream.

The unit of video information may comprise any of a large variety of types of units of video information. For example and without limitation, the unit of video information may comprise information of a television program, a movie, a music video, kinetic video art, a video commercial, a teleconference, etc. A unit of video information may, for example, be requested by a user or may be communicated automatically. A unit of video information may, for example, be unicast, multicast or broadcast. Accordingly, the scope of various aspects of the present invention should not be limited by characteristics of a particular unit of video information.

Step 220 may comprise obtaining the first video information stream in any of a variety of manners. For example, step 220 may comprise receiving the first video information stream from a database. Such a database may, for example, be a local database or a networked database.

Step 220 may, for example, comprise obtaining the unit of video information from a video information source and generating the first video information stream from the obtained unit of video information. Step 220 may, for example, comprise obtaining the unit of video information from a local source or through a networked source. Such generating may, for example and without limitation, comprise encoding the unit of video information into the first video information stream. Such generating may comprise encoding the unit of video information according to any of a large variety of encoding techniques and quality levels.

In general, step 220 may comprise obtaining a first video information stream representative of the unit of video information. Accordingly, the scope of various aspects of the present invention should not be limited by characteristics of the first video information stream, the unit of video information, a source of the first video information stream, a source of the unit of video information, or a way of obtaining the first video information stream.

The exemplary method 200 may, at step 230, comprise obtaining a second video information stream representative of the unit of video information (i.e., the same unit of video information that the first video information stream obtained at step 220 is representative of). Step 230 may, for example and without limitation, comprise obtaining the second video information stream from an information source (e.g., an information source as discussed previously with regard to the information source 110 illustrated in FIG. 1). The second video information stream may share various characteristics with the first video information stream discussed previously.

Step 230 may comprise obtaining the second video information stream in any of a variety of manners. For example, step 230 may comprise receiving the second video information from a database. Such a database may, for example, be a local database or a networked database.

Step 230 may comprise generating a time-delayed version of the first video information stream, obtained at step 220. Such a time-delayed version may, for example, be temporally delayed relative to the first video information stream by less than the average time between access points in the first video information stream. Such a time-delayed version may, for example, be delayed relative to the first video information stream by a particular temporal quantity (e.g., one or two seconds, or one or two minutes).

Step 230 may, for example, comprise obtaining the unit of video information and generating the second video information stream from the unit of video information. Step 230 may, for example, comprise obtaining the unit of video information from a local source or through a communication network. Such generating may, for example and without limitation, comprise encoding the unit of video information into the second video information stream. Such generating may comprise encoding the unit of video information according to any of a large variety of encoding techniques and quality levels.

In an exemplary scenario where step 220 comprises generating the first video information stream by encoding the unit of video information and step 230 comprises generating the second video information stream by encoding the unit of video information, steps 220 and 230 may comprise encoding the unit of information at respective quality levels. Such quality levels may, for example, be substantially identical or may be substantially different.

In general, step 230 may comprise obtaining a second video information stream representative of the unit of video information. Accordingly, the scope of various aspects of the present invention should not be limited by characteristics of the second video information stream, the unit of video information, a source of the second video information stream, a source of the unit of video information, or a way of obtaining the second video information stream.

The exemplary method 200 may, at step 240, comprise transmitting the first video information stream. For example, step 240 may comprise transmitting the first video information stream in a manner in which the first video information stream will correspond to a video channel (e.g., a television channel, video program or other video communication channel).

The exemplary method 200 may, at step 250, comprise transmitting the second video information stream. For example, step 250 may comprise transmitting the second video information stream in a manner in which the second video information stream will correspond to the video channel (i.e., the same channel to which the first video information stream corresponds).

In an exemplary television scenario, steps 240 and 250 may comprise transmitting the first and second video information streams in a manner in which both the first and second video information streams correspond to television channel M. The exemplary steps 240 and 250 may, for example, comprise transmitting the first and second video information streams in this manner, even though the first and second video information streams may each comprise information of the same unit of video information.

Exemplary steps 240 and 250 may comprise transmitting the first and second video information streams such that the first and second video information streams are substantially temporally aligned. For example and without limitation, the transmitted first and second video information streams may be temporally aligned to within one-to-two seconds (or one-to-two minutes). In a non-limiting exemplary scenario, where the second video information stream comprises a time-shifted version of the first video information stream, the transmitted first and second video information streams may be temporally aligned to less than the average time between access points in the first video information stream.

As mentioned previously, the first and second video information streams may each comprise respective access points. Exemplary steps 240 and 250 may, for example, comprise transmitting the first and second video information streams such that access points of the transmitted first video information stream are generally temporally displaced from access points of the transmitted second video information stream. For example and without limitation, access points of the transmitted first video information stream may be generally temporally staggered (or alternated) with access points of the transmitted second video information stream. Note, however, that since access points within a video information stream may have variable temporal spacing, access points of the transmitted first and second video streams may be generally temporally displaced, while a portion of the access points may also be temporally aligned.

Also for example, such temporal displacement or staggering of access points need not be perfectly symmetrical. For example, in an exemplary scenario where the first and second video information streams have different respective numbers of access points, the access points of the transmitted streams may be temporally staggered (or alternated) asymmetrically. That is, an access point of the transmitted first video information stream may be transmitted, followed by one, two or P access points of the transmitted second video information stream, and then followed by the next access point of the first video information stream.

In general, steps 240 and 250 may comprise transmitting the first and second video information streams simultaneously and corresponding to the same video channel. Accordingly, the scope of various aspects of the present invention should not be limited by characteristics of a particular temporal relationship between the transmitted video information streams or by a particular temporal relationship between access points of the transmitted video information streams.

The exemplary steps 240 and 250 may, for example, comprise transmitting the first and second video information streams over any of a variety of communication network types, utilizing any of a variety of communication media, utilizing any of a variety of modulation techniques, and utilizing any of a variety of communication protocols. For example, steps 240 and 250 may comprise transmitting the first and second video information streams over a television network, radio network, telephone network, computer network, etc. The steps 240 and 250 may, for example, comprise transmitting the first and second video information streams over wired, wireless or optical communication media. The steps 240 and 250 may, for example, comprise transmitting the first and second video information streams utilizing a television protocol, telephone protocol, data communication protocol, audio protocol, etc.

In an exemplary television scenario, steps 240 and 250 may comprise transmitting the first and second video information streams over a cable or satellite television network. The exemplary steps 240 and 250 may, for example, comprise transmitting the first and second video information streams as components of a multi-stream communication channel (e.g., as components of a single QAM channel). Such an exemplary transmission may, for example, provide for the first and second video information streams to be more easily received using a single tuner/receiver pair.

As mentioned previously, the first and second video information streams may comprise respective access points. In an exemplary non-limiting scenario, steps 240 and 250 may also comprise transmitting information of access point timing for at least one of the first and second video information streams. As discussed later, a receiver may utilize such information to determine which of the first and second video information streams will communicate the next access point.

In general, exemplary steps 240 and 250 may comprise transmitting the first and second video information streams simultaneously and corresponding to the same video channel. Accordingly, the scope of various aspects of the present invention should not be limited by characteristics of a particular communication network, media, modulation technique or communication protocol.

Figure 3:
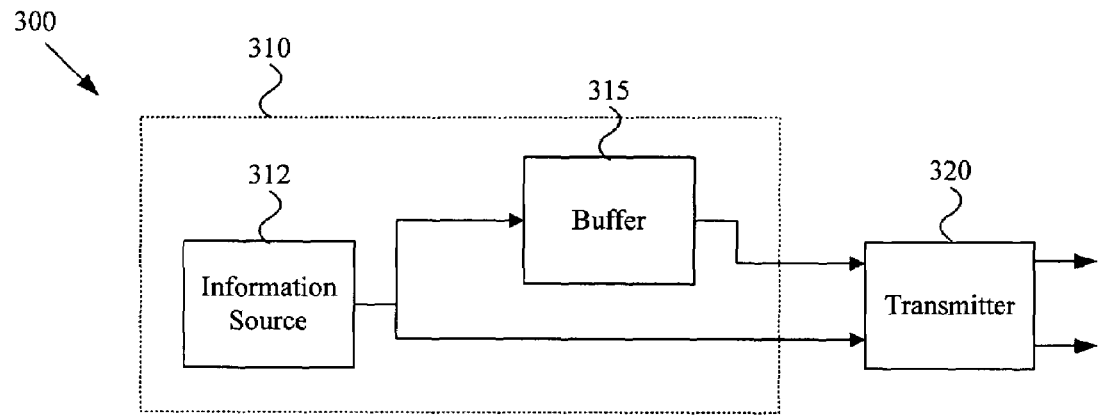
FIG. 3 is a diagram showing an exemplary video transmission system that provides reduced latency, in accordance with various aspects of the present invention.

FIG. 3 is a diagram showing an exemplary video transmission system 300 that provides reduced latency, in accordance with various aspects of the present invention. The exemplary system 300 may comprise an information source 310 and a transmitter 320. The information source 310 and transmitter 320 may, for example and without limitation, share various characteristics with the information source 110 and transmitter 120 illustrated in FIG. 1 and discussed previously. Also, for example and without limitation, the exemplary information source 310 and transmitter 320 may perform various aspects of the method 200 illustrated in FIG. 2 and discussed previously.

The exemplary information source 310 may, for example, comprise an information source sub-module 312 and a buffer module 315. The information source sub-module 312 may provide a first video information stream. The first video information stream may share various characteristics with the first video information streams discussed previously.

The information source sub-module 312 may, for example, provide a first video information stream representative of a unit of video information. The first video information stream may, for example and without limitation, comprise a serial stream of video-related data. For example, a serial stream may comprise video data that has been encoded according to a block encoding standard (e.g., MPEG-2, MPEG-4, MPEG-4 AVC, etc.). Also, for example, a serial stream may comprise video data that has not been encoded according to a block encoding standard (e.g., digitized chroma and luma information). Accordingly, the scope of various aspects of the present invention should not be limited by characteristics of a particular type of video information or a particular type of video information stream.

The unit of video information may comprise any of a large variety of types of units of video information. For example and without limitation, the unit of video information may comprise information of a television program, a movie, a music video, kinetic video art, a video commercial, a teleconference, etc. A unit of video information may be requested by a user or may be communicated automatically. A unit of video information may be unicast, multicast or broadcast. Accordingly, the scope of various aspects of the present invention should not be limited by characteristics of a particular unit of video information.

The information source sub-module 312 may, for example, provide the first video information stream to the transmitter 320. The information source sub-module 312 may also, for example, provide the first video information stream to the buffer module 315.

The buffer module 315 (or a general time delay module) may, for example, receive the first video information stream and output a second video information stream comprising a time-shifted version of the first video information stream. For example and without limitation, the buffer module 315 may generate a time-delayed version of the first video information stream (e.g., as discussed previously regarding step 230 of the exemplary method 200 illustrated in FIG. 2 and discussed previously).

The transmitter 320 may receive the first video information stream and the second video information stream from the information source 310 (e.g., from the information source sub-module 312 and the buffer module 315, respectively). The exemplary transmitter 320 may then, for example, transmit the first and second video information streams. For example and without limitation, the transmitter may share various characteristics with the exemplary transmitter 120 illustrated in FIG. 1 and discussed previously. Also for example and without limitation, the exemplary transmitter 320 may perform various aspects of the exemplary method 200 (e.g., steps 240 and 250) illustrated in FIG. 2 and discussed previously.

Figure 4:
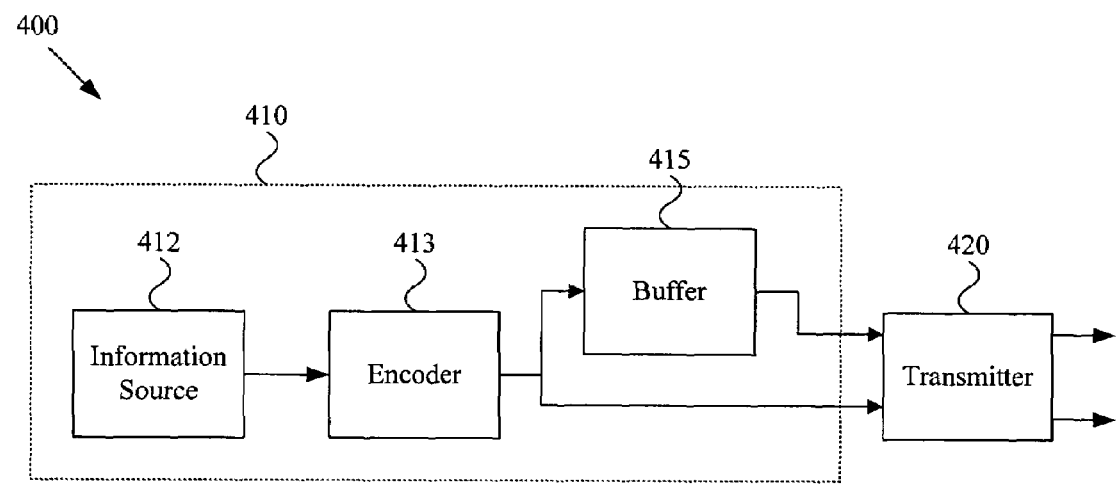
FIG. 4 is a diagram showing an exemplary video transmission system that provides reduced latency, in accordance with various aspects of the present invention.

FIG. 4 is a diagram showing an exemplary video transmission system 400 that provides reduced latency, in accordance with various aspects of the present invention. The exemplary system 400 may comprise an information source 410 and a transmitter 420. The information source 410 and transmitter 420 may, for example and without limitation, share various characteristics with the information source 110 and transmitter 120 illustrated in FIG. 1 and discussed previously, and with the information source 310 and transmitter 320 illustrated in FIG. 3 and discussed previously. Also, for example and without limitation, the exemplary information source 410 and transmitter 420 may perform various aspects of the method 200 illustrated in FIG. 2 and discussed previously.

The exemplary information source 410 may, for example, comprise an information source sub-module 412, an encoder module 413 and a buffer module 415. The information source sub-module 412 may provide a unit of video information. As discussed previously, such a unit of video information may comprise any of a large variety of types of units of video information and/or characteristics thereof.

The encoder module 413 may, for example, receive the unit of video information from the information source sub-module 412 and output a first video information stream representative of the unit of video information. The first video information stream may, for example and without limitation, share various characteristics with the first video information streams discussed previously. For example, as discussed previously, the first video information stream may comprise a serial stream of video-related data. The first video information stream may, for example, comprise a stream of encoded video data corresponding to the unit of video information received from the information source sub-module 412. The encoder module 413 may provide the first video information stream to the transmitter 420.

The encoder module 413 may also, for example, provide the first video information stream to the buffer module 415. The buffer module 415 (or a general time delay module) may, for example, receive the first video information stream from the encoder module 413 and output a second video information stream comprising a time-shifted version of the first video information stream. For example and without limitation, the buffer module 415 may generate a time-delayed version of the first video information stream (e.g., as discussed previously regarding step 230 of the exemplary method 200 illustrated in FIG. 2 and discussed previously). Also, for example and without limitation, the buffer module 415 may share various characteristics with the buffer module 315 of the exemplary system 300 illustrated in FIG. 3 and discussed previously.

The transmitter 420 may receive the first video information stream and the second video information stream from the information source 410 (e.g., from the encoder module 413 and the buffer module 415, respectively). The exemplary transmitter 420 may then, for example, transmit the first and second information streams. For example and without limitation, the transmitter 420 may share various characteristics with the exemplary transmitter 120 illustrated in FIG. 1 and discussed previously and the exemplary transmitter 320 illustrated in FIG. 3 and discussed previously. Also for example and without limitation, the exemplary transmitter 420 may perform various aspects of the exemplary method 200 (e.g., steps 240 and 250) illustrated in FIG. 2 and discussed previously.

Figure 5:
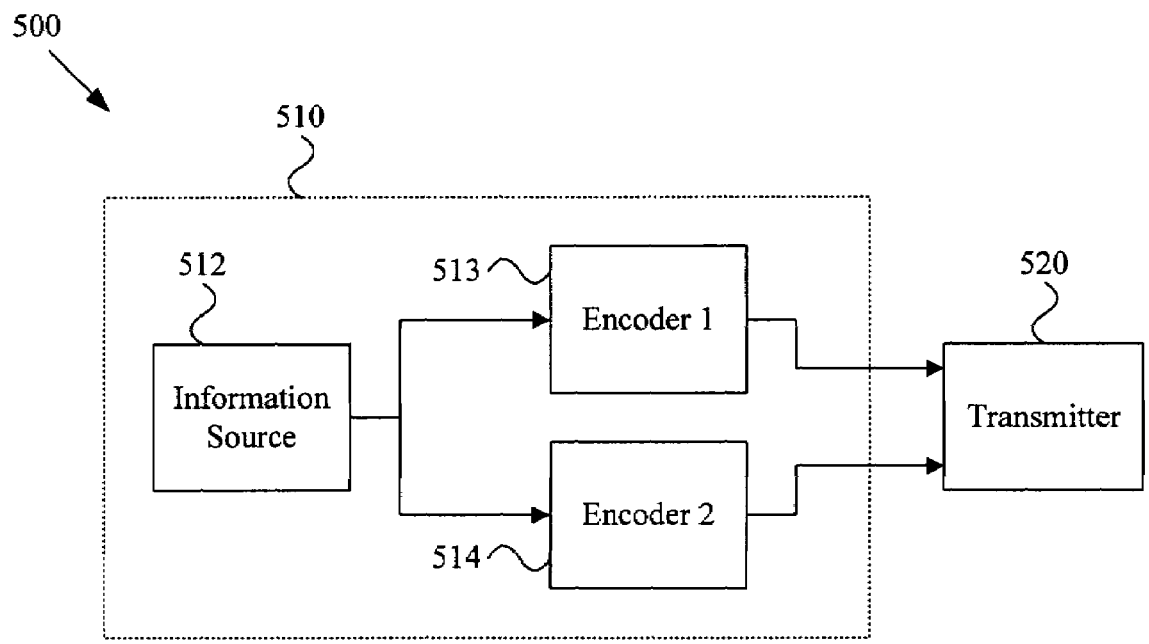
FIG. 5 is a diagram showing an exemplary video transmission system that provides reduced latency, in accordance with various aspects of the present invention.

FIG. 5 is a diagram showing an exemplary video transmission system 500 that provides reduced latency, in accordance with various aspects of the present invention. The exemplary system 500 may comprise an information source 510 and a transmitter 520. The information source 510 and transmitter 520 may, for example and without limitation, share various characteristics with the information source 110 and transmitter 120 illustrated in FIG. 1 and discussed previously, with the information source 310 and transmitter 320 illustrated in FIG. 3 and discussed previously, and with the information source 410 and transmitter 420 illustrated in FIG. 4 and discussed previously. Also, for example and without limitation, the exemplary information source 510 and transmitter 520 may perform various aspects of the method 200 illustrated in FIG. 2 and discussed previously.

The exemplary information source 510 may, for example, comprise an information source sub-module 512, a first encoder module 513 and a second encoder module 514. The information source sub-module 512 may provide a unit of video information. As discussed previously, such a unit of video information may comprise any of a large variety of units of video information and/or characteristics thereof.

The first encoder module 513 may, for example, receive the unit of video information from the information source sub-module 512 and output a first video information stream representative of the unit of video information. The first encoder module 513 may, for example, encode the unit of video information according to any of a large variety of encoding techniques and quality levels.

The first information stream may, for example and without limitation, share various characteristics with the first video information streams discussed previously (e.g., as discussed regarding step 220 of exemplary method 200). For example, as discussed previously, the first video information stream may comprise a serial stream of video-related data. The first video information stream may, for example, comprise a stream of encoded video data corresponding to the unit of video information received from the information source sub-module 512. The first encoder module 513 may provide the first video information stream to the transmitter 520.

The second encoder module 514 may, for example, receive the unit of video information from the information source sub-module 512 and output a second video information stream representative of the unit of video information. The second encoder module 514 may, for example, encode the unit of video information according to any of a large variety of encoding techniques and quality levels. For example, the second encoder module 514 may encode the unit of information in a manner similar to the manner in which the first encoder module 513 encodes the unit of information.

The second information stream may, for example and without limitation, share various characteristics with the first and/or second video information streams discussed previously (e.g., as discussed regarding step 230 of exemplary method 200). For example, as discussed previously, the second video information stream may comprise a serial stream of video-related data. The second video information stream may, for example, comprise a stream of encoded video data corresponding to the unit of video information received from the information source sub-module 512. The second encoder module 514 may provide the second video information stream to the transmitter 520.

In an exemplary scenario, the first encoder module 513 and the second encoder module 514 may encode the first and second video information streams such that the access points of the first and second video information streams are temporally staggered (or alternating) when the first and second video information streams are temporally synchronized overall. Alternatively for example, the first encoder module 513 and the second encoder module 514 may encode the first and second video information streams such that the first and second video information streams comprise different respective numbers of access points.

In an exemplary scenario where the first encoder module 513 generates the first video information stream by encoding the unit of video information and the second encoder module 514 generates the second video information stream by encoding the unit of video information, the first encoder module 513 and second encoder module 514 may encode the unit of information at respective quality levels. Such quality levels may, for example, be substantially identical or may be substantially different.

The transmitter 520 may receive the first video information stream and the second video information stream from the information source 510 (e.g., from the first encoder module 513 and the second encoder module 514 respectively). The exemplary transmitter 520 may then, for example, transmit the first and second information streams. For example and without limitation, the transmitter 520 may share various characteristics with the exemplary transmitter 120 illustrated in FIG. 1 and discussed previously, the exemplary transmitter 320 illustrated in FIG. 3 and discussed previously, and the exemplary transmitter 420 illustrated in FIG. 4 and discussed previously. Also for example and without limitation, the exemplary transmitter 520 may perform various aspects of the exemplary method 200 (e.g., steps 240 and 250) illustrated in FIG. 2 and discussed previously.

Figure 6:
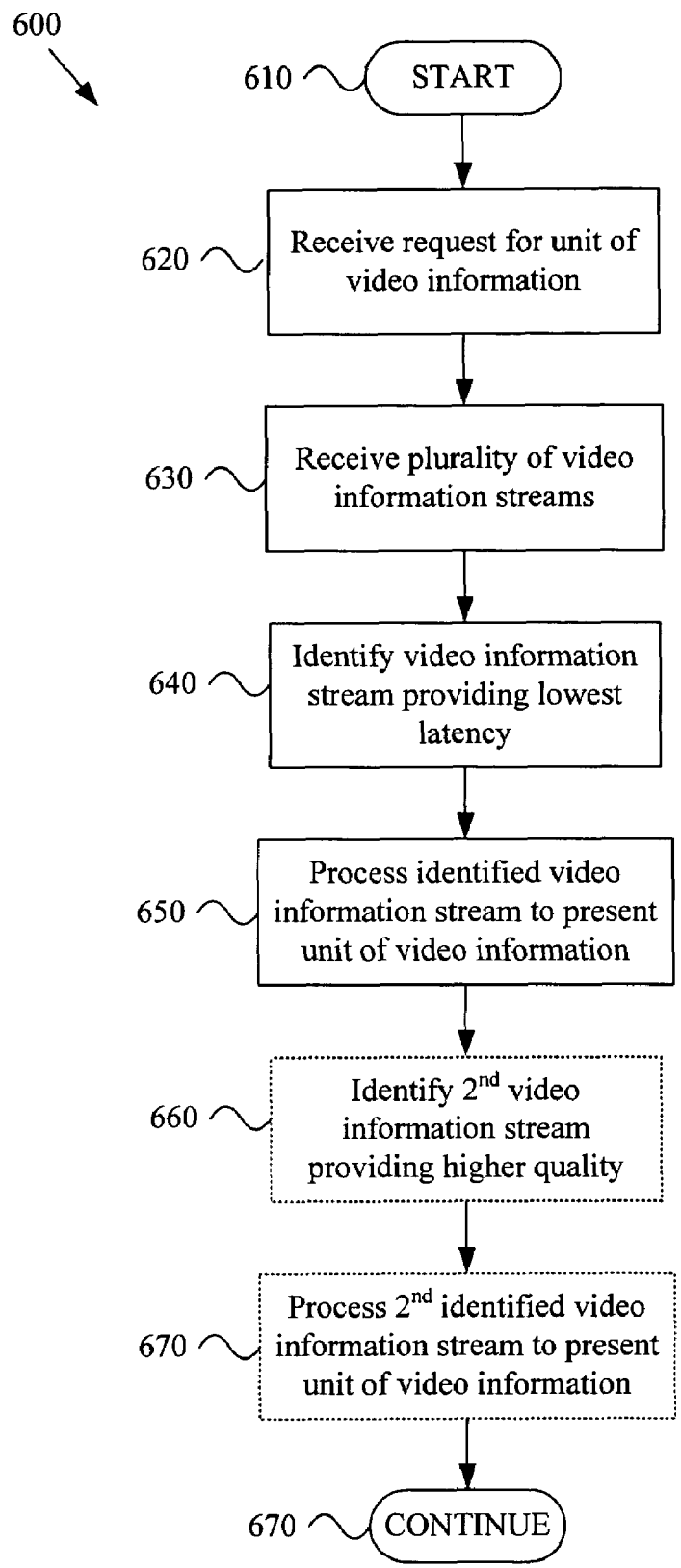
FIG. 6 is a flow diagram illustrating an exemplary method for providing reduced latency in a video reception system, in accordance with various aspects of the present invention.

FIG. 6 is a flow diagram illustrating an exemplary method 600 for providing reduced latency in a video reception system, in accordance with various aspects of the present invention. The exemplary method 600 may, for example and without limitation, be performed by the receiver 130 of the exemplary system 100 illustrated in FIG. 1 and discussed previously. The exemplary method 600 may also, for example and without limitation, receive and/or process video information streams as produced by the exemplary method 200 illustrated in FIG. 2 and discussed previously, and the exemplary systems 300-500 illustrated in FIGS. 3-5 and discussed previously.

The exemplary method 600 may begin at step 610 in response to any of a large variety of causes and conditions. For example and without limitation, in an exemplary video signal-processing scenario, the method 600 may begin when a video reception system implementing the method 600 receives a request for a unit of video information. Alternatively, for example, the method 600 may begin when a video reception system implementing the method 200 is powered up or initialized. Accordingly, the scope of various aspects of the present invention should not be limited by characteristics of any particular initiating events or conditions.

The exemplary method 600 may, at step 620, comprise receiving a request for a unit of video information. Such a request may, for example, be originated by a user directly or indirectly (e.g., through a programmed device). The request may, for example and without limitation, comprise a video channel change request. In a non-limiting exemplary scenario, the request may comprise a television channel change request. Alternatively for example, the request may comprise a request for a particular unit of video information, or a request for a particular unit of video information to be presented in a particular manner (e.g., at a particular rate and/or temporal direction).

Exemplary step 620 may comprise receiving such a request in any of a large variety of ways. For example, step 620 may comprise receiving the request through a variety of user interfaces or device communication interfaces. Step 620 may also, for example, comprise receiving the request from a local source or a remote source (e.g., through a communication network).

In general, exemplary step 620 may comprise receiving a request for a unit of video information. Accordingly, the scope of various aspects of the present invention should not be limited by characteristics of a particular request, source of a particular request, or manner of receiving a particular request.

The exemplary method 600 may, at step 630, comprise receiving a plurality of video information streams, each of which represents the requested unit of video information. For example and without limitation, each of the plurality of video information streams may correspond to a single video channel (e.g., a television channel or program).

In this discussion, "receiving a plurality of video streams" may generally mean that the plurality of video information streams arrives at a system implementing the exemplary method 600. The term "receiving" is by no means, in itself, to be construed as requiring particular signal processing. For example and without limitation, the term "receiving" is not to be construed, in itself, to require demodulation, data detection, decoding, decrypting or converting. Note however, that in various contexts, various processing activities may be implied. For example and without limitation, in a scenario where specific received data is analyzed, some type of demodulation or data detection, if necessary to access the analyzed data, may be implied.

In an exemplary scenario, step 630 may comprise receiving the plurality of video information streams over a single multi-stream communication channel. Alternatively, for example, step 630 may comprise receiving the plurality of video information streams over multiple parallel communication channels.

In an exemplary scenario, step 630 may also comprise receiving information of access point timing for at least one of the plurality of video information streams. Such information of access point timing may, for example and without limitation, comprise information indicating expected time of arrival for various access points in one or more of the plurality of video information streams.

In general, step 630 may comprise receiving a plurality of video information streams, each of which represents the requested unit of video information. Accordingly, the scope of various aspects of the present invention should not be limited by characteristics of a particular video information stream, video information stream source, or manner of receiving a video information stream.

The exemplary method 600 may, at step 640, comprise identifying which of the plurality of video information streams, when processed, is expected to result in the lowest latency in presenting the unit of video information. For example and without limitation, in an exemplary scenario where the method 600 may begin processing a video information stream at the next access point, step 640 may comprise identifying which of the plurality of received video information streams will communicate the next access point.

Step 640 may, for example, comprise identifying which of the plurality of video information streams is expected to result in the lowest latency in any of a variety of ways. For example, the step 640 may comprise identifying access points in each of the received plurality of video information streams to determine which of the received plurality of video information streams will communicate the next access point. Also for example, step 640 may comprise identifying access points in one of the plurality of video information streams and (e.g., based on a known temporal relationship between access points in the respective plurality of video information streams) determine which of the received plurality of video information streams will communicate the next access point. Alternatively, for example, step 640 may comprise receiving information of access point timing and analyzing such information to determine which of the plurality of video information streams will communicate the next access point. Alternatively, for example, step 640 may comprise receiving information indicating which of the plurality of video information streams has more frequent access points and would therefore be expected generally to result in the lowest latency.

In general, the step 640 may comprise identifying which of the received plurality of video information streams, when processed, is expected to result in the lowest latency in presenting the unit of video information. Accordingly, the scope of various aspects of the present invention should not be limited by characteristics of a particular way of identifying the lowest latency video information stream.

The exemplary method 600 may, at step 650, comprise processing the identified video information stream to present the unit of video information. Step 650 may, for example, comprise processing the identified video information stream to present the unit of video information to a user (e.g., utilizing a video display device).

Exemplary step 650 may, for example and without limitation, comprise decoding the video information stream identified at step 640. Step 650 may, for example, comprise converting the identified video information stream to a display driver signal, which may be utilized to drive a display device. Step 650 may also, for example, comprise performing conditional access processing related to the identified video information stream. In general, step 650 may comprise processing the identified video information stream to present the unit of video information. Accordingly, the scope of various aspects of the present invention should not be limited by characteristics of particular processing activities performed with video information to present such information.

As mentioned previously, in various exemplary scenarios, the plurality of video information streams may represent the same unit of video information. For example and without limitation, a first video information stream may correspond to expected lower video presentation latency, while a second video information stream may correspond to a higher video quality. Steps 660 and 670 of the exemplary method 600 provide a non-limiting illustration of how such streams might be processed. Note that exemplary steps 660 and 670 are merely exemplary, and their presence or absence should by no means limit the scope of various aspects of the present invention.

Exemplary step 660 may comprise identifying a second video information stream, where the second video information stream corresponds to higher quality video information than the video information stream identified at step 640 and processed at step 650. For example and without limitation, the second video information stream may comprise video information having a higher temporal, spatial and/or color resolution.

Exemplary step 670 may then comprise processing the identified second video information stream to present the video information to the user. For example and without limitation, when an access point into the second video information stream arrives (or relatively soon after) step 670 may comprise substituting video output corresponding to the second video information stream for video output corresponding to the originally identified video information stream and output at step 650.

Figure 7:
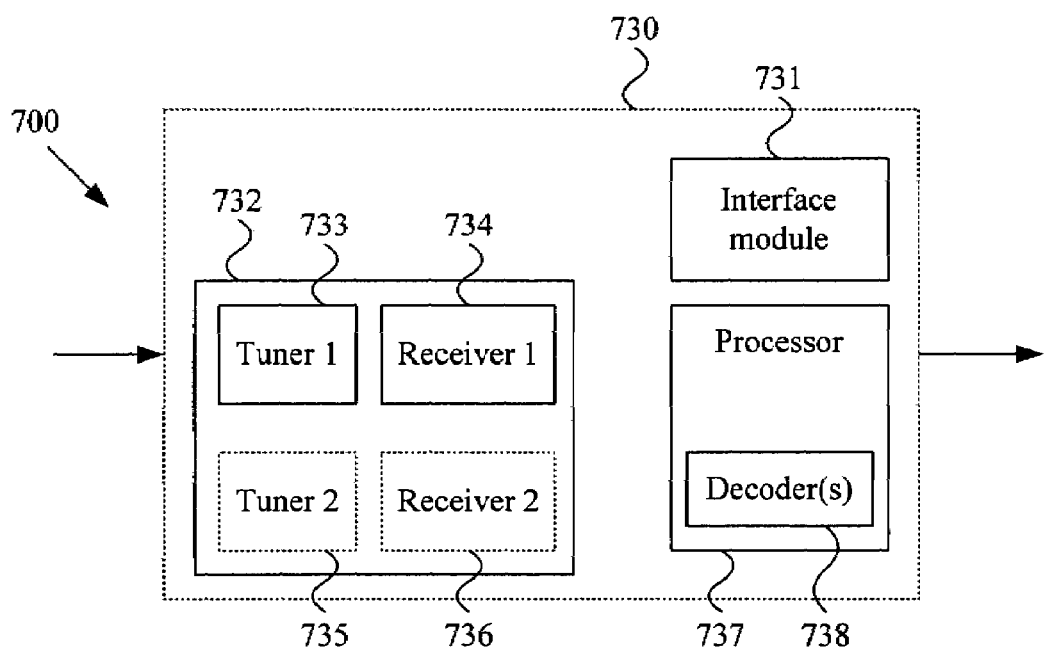
FIG. 7 is a diagram showing an exemplary video reception system that provides reduced latency, in accordance with various aspects of the present invention.

FIG. 7 is a diagram showing an exemplary video reception system 700 that provides reduced latency, in accordance with various aspects of the present invention. The exemplary video reception system 700 may, for example and without limitation, share various characteristics with the receiver 130 of the exemplary video communication system 100 illustrated in FIG. 1 and discussed previously. Also for example and without limitation, various components of the video reception system 700 may perform various functionality of the exemplary method 600 illustrated in FIG. 6 and discussed previously.

The exemplary video reception system 700 may comprise an interface module 731 that receives a request to present a unit of video information. The interface module 731 may, for example and without limitation, perform various aspects of the exemplary method 600 (e.g., step 620) illustrated in FIG. 6 and discussed previously.

A request for a unit of video information may, for example, be originated by a user directly or indirectly (e.g., through a programmed device). The request may, for example and without limitation, comprise a video channel change request. In a non-limiting exemplary scenario, the request may comprise a television channel change request. Alternatively for example, the request may comprise a request for a particular unit of video information, or a request for a particular unit of video information to be presented in a particular manner (e.g., at a particular rate and/or temporal direction).

The interface module 731 may receive such a request in any of a large variety of ways. For example, the interface module 731 may receive the request through any of a variety of user interfaces or device communication interfaces. The interface module 731 may also, for example, receive the request from a local source or a remote source (e.g., through a communication network).

In general, the interface module 731 may receive a request to present a unit of video information. Accordingly, the scope of various aspects of the present invention should not be limited by characteristics of a particular request, source of a particular request, or manner of receiving a particular request.

The exemplary video reception system 700 may comprise a receiver module 732 that receives a plurality of video information streams, each of which represents the unit of video information. The receiver module 732 may, for example and without limitation, perform various functionality of the exemplary method 600 (e.g., step 630) illustrated in FIG. 6 and discussed previously. For example and without limitation, each of the plurality of video information streams may correspond to a particular video channel (e.g., a television channel or program).

The exemplary receiver module 732 may comprise a first tuner 733 and first receiver 734. Such a first tuner/receiver pair 733-734 may receive one or more video information streams and convert such received video information streams into digital video data. The exemplary receiver module 732 may, for example and without limitation, also comprise a second tuner 735 and second receiver 736, where the second tuner/receiver pair 735-736 may also receive one or more video information streams and convert such received video information streams into digital video data.

In an exemplary scenario, the first tuner/receiver pair 733-734 may receive a plurality of video information streams. For example, the first tuner/receiver pair 733-734 may receive the plurality of video information streams on a single multi-stream communication channel. In another exemplary scenario, the first tuner/receiver pair 733-734 may receive a first video information stream, and the second tuner/receiver pair 735-736 may receive a second video information stream.

In general, the exemplary receiver module 732 may receive a plurality of video information streams, each of which represents the unit of video information. Accordingly, the scope of various aspects of the present invention should not be limited by characteristics of a particular video information stream, particular video information source, particular receiver module, or by characteristics of particular methods or apparatus for receiving a plurality of video information streams.

The exemplary video reception system 700 may comprise a processor module 737 that identifies which of the plurality of video information streams, when processed, is expected to result in the lowest latency in presenting the unit of video information. For example and without limitation, the processor module 737 may perform various functionality of the exemplary method 600 (e.g., steps 640 and 650) illustrated in FIG. 6 and discussed previously.

The processor module 737 may, for example, identify which of the plurality of video information streams is expected to result in the lowest latency in any of a variety of ways. For example, the processor module 737 may identify access points in each of the received plurality of video information streams to determine which of the received plurality of video information streams is expected to communicate the next access point. Also for example, the processor module 737 may identify access points in one of the plurality of video information streams and (e.g., based on a known temporal relationship between access points in the respective plurality of video information streams) determine which of the received plurality of video information streams will communicate the next access point. Alternatively, for example, the processor module 737 may receive information of access point timing and analyze such information to determine which of the plurality of video information streams will communicate the next access point. Alternatively, for example, the processor module 737 may receive information indicating which of the plurality of video information streams has more frequent access points and would therefore be expected generally to result in the lowest latency.

In general, the processor module 737 may identify which of the received plurality of video information streams, when processed, is expected to result in the lowest latency in presenting the unit of video information. Accordingly, the scope of various aspects of the present invention should not be limited by characteristics of a particular way of identifying the lowest latency video information stream or apparatus for identifying the lowest latency video information stream.

Once the video information stream that is expected to result in the lowest latency is identified, the exemplary processor module 737 may, for example, process the identified video information stream to present the unit of video information. The processor module 737 may, for example, process the identified video information stream to present the unit of video information to a user (e.g., utilizing a video display device). Note that as mentioned previously with regard to the exemplary functionality illustrated in FIG. 6 (e.g., steps 660 and 670), the processor module may also later process a different one of the plurality of video information streams, for example if the different video information stream is expected to result in improved video quality.

For example and without limitation, the processor module 737 may comprise one or more video decoders 738 that decode the identified video information stream. The processor module 737 may, for example, convert the identified video information stream to a display driver signal, which may be utilized to drive a display device. The processor module 737 may also, for example, perform conditional access processing related to the identified video information stream. In general, the processor module 737 may process the identified video information stream to present the unit of video information. Accordingly, the scope of various aspects of the present invention should not be limited by characteristics of particular processing activities performed with video information to present such information or by characteristics of particular video processing apparatus.

The previous discussion described various exemplary system components, modules and sub-modules. The various components, modules and sub-modules may be implemented using hardware, software, or a combination thereof. For example and without limitation, any of the various components, modules and sub-modules may be independent circuits or may be integrated into a single integrated circuit. Further for example, various components, modules and sub-modules may be co-located or may be distributed throughout a network. Accordingly, the scope of various aspects of the present invention should not be limited by characteristics of a particular hardware or software implementations.

In summary, various aspects of the present invention provide a system and method that provide reduced latency in a video signal processing system. While the invention has been described with reference to certain aspects and embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method, in a video information source, for transmitting video information, the method comprising:
   generating a first video information stream representative of a unit of video information;
   transmitting the first video information stream, the transmitted first video information stream corresponding to a video channel;
   generating a second video information stream representative of the unit of video information by, at least in part, time-shifting the first video information stream by an amount that is less than the average time between access points in the first video information stream; and
   transmitting the second video information stream simultaneously with the first video information stream, the transmitted second video information stream corresponding to the video channel.

2. The method of claim 1, wherein the transmitted first video information stream is substantially temporally aligned with the transmitted second video information stream.

3. The method of claim 1, wherein the first and second video information streams comprise access points, and wherein the access points of the transmitted first video information stream are generally temporally displaced from access points of the transmitted second video information stream.

4. The method of claim 1, wherein the first and second video information streams comprise access points, and wherein the access points of the transmitted first video information stream are generally more frequent than access points of the transmitted second video information stream.

5. The method of claim 1, wherein the first and second video information streams comprise access points, and wherein the access points of the transmitted first video information stream temporally alternate with access points of the transmitted second video information stream.

6. The method of claim 1, wherein:
   the first and second video information streams comprise access points;
   the transmitted first and second video information streams are substantially temporally aligned; and
   access points of the transmitted first video information stream are generally temporally displaced from access points of the transmitted second video information stream.

7. The method of claim 1, wherein time-shifting the first video information stream comprises time-shifting the first video information stream by a constant amount of time.

8. The method of claim 1, wherein:
   the generated first video information stream comprises a first set of access points; and the generated second video information stream comprises a second set of access points that is different from the first set of access points.

9. A method, in a video information source, for transmitting video information, the method comprising:
generating a first video information stream representative of a unit of video information, the first video information stream corresponding to a video channel, wherein generating the first video information stream comprises encoding the unit of video information at a video quality level;
transmitting the first video information stream;
generating a second video information stream representative of the unit of video information, the second video information stream corresponding to said video channel, wherein generating the second video information stream comprises encoding the unit of video information at the video quality level; and
transmitting the second video information stream simultaneously with the first video information stream;
wherein generating the second video information stream comprises time-shifting the first video information stream by an amount of time that is less than the average time between access points in the first video information stream.

10. The method of claim 1, wherein:
generating the first video information stream comprises encoding the unit of video information at a first video quality level; and
generating the second video information stream comprises encoding the unit of video information at a second video quality level that is different from the first video quality level.

11. The method of claim 1, wherein:
transmitting the first video information stream comprises transmitting the first video information stream over a multi-stream communication channel; and
transmitting the second video information stream comprises transmitting the second video information stream over the multi-stream communication channel.

12. A method, in a video information source, for transmitting video information, the method comprising:
transmitting a first video information stream representative of a unit of video information, the first video information stream corresponding to a video channel;
transmitting a second video information stream representative of the unit of video information simultaneously with the first video information stream, the second video information stream corresponding to the video channel; and
transmitting information of access point timing for at least one of the first video information stream and the second video information stream, said information of access point timing indicative of in which one of the at least first video information stream and second video information stream the next access point will arrive.

13. A system for transmitting video information, the system comprising:
a video information source comprising a time delay module and operable to, at least:
generate a first video information stream representative of a unit of video information; and
generate a second video information stream representative of the unit of video information by, at least in part, utilizing the time delay module to time-shift the first video information stream by an amount of time that is less than the average time between access points in the first video information stream; and
a transmitter, communicatively coupled to the video information source, that is operable to at least:
transmit the first video information stream, the transmitted first video information stream corresponding to a video channel; and
transmit the second video information stream simultaneously with the first video information stream, the transmitted second video information stream corresponding to the video channel.

14. The system of claim 13, wherein the transmitted first video information stream and the transmitted second video information stream are substantially temporally aligned.

15. The system of claim 13, wherein the first and second video information streams comprise access points, and wherein the access points of the transmitted first video information stream are generally temporally displaced from access points of the transmitted second video information stream.

16. The system of claim 13, wherein the first and second video information streams comprise access points, and wherein the access points of the transmitted first video information stream are generally more frequent than access points of the transmitted second video information stream.

17. The system of claim 13, wherein the first and second video information streams comprise access points, and wherein the access points of the transmitted first video information stream temporally alternate with access points of the transmitted second video information stream.

18. The system of claim 13, wherein:
the first and second video information streams comprise access points;
the transmitted first and second video information streams are substantially temporally aligned; and
access points of the transmitted first video information stream are generally temporally displaced from access points of the transmitted second video information stream.

19. The system of claim 13, wherein the video information source is operable to generate the second video information stream by, at least in part, utilizing the time delay module to time-shift the first video information stream by a constant amount of time.

20. The system of claim 13, wherein:
the generated first video information stream comprises a first set of access points; and
the generated second video information stream comprises a second set of access points that is different from the first set of access points.

21. A system for transmitting video information, the system comprising:
a video information source operable to, at least:
generate a first video information stream representative of a unit of information by, at least in part, operating to encode the unit of video information at a video quality level; and
generate the second video information stream representative of the unit of information by, at least in part, operating to encode the unit of video information at the video quality level;
wherein said video information source generates the second video information stream by, at least in part, operating to time-shift the first video information stream by an amount of time that is less than the average time between access points in the first video information stream; and a transmitter, communicatively coupled to the video information source, operable to, at least:
transmit the first video information stream, the transmitted first video information stream corresponding to a video channel; and
transmit the second video information stream simultaneously with the first video information stream, the transmitted second video information stream corresponding to the video channel.

22. The system of claim 13, wherein the video information source comprises at least one encoder module operable to:
generate the first video information stream by, at least in part, encoding the unit of video information at a first video quality level; and
generate the second video information stream by, at least in part, encoding the unit of video information at a second video quality level that is different from the first video quality level.

23. The system of claim 13, wherein the transmitter is operable to:
transmit the first video information stream over a multi-stream communication channel; and
transmit the second video information stream over the multi-stream communication channel.

24. A system for transmitting video information, the system comprising:
a video information source operable to, at least:
generate a first video information stream representative of a unit of video information; and
generate a second video stream representative of the unit of video information; and
a transmitter, communicatively coupled to the video information source, operable to, at least:
transmit the first video information stream, the transmitted first video information stream corresponding to a video channel;
transmit the second video information stream simultaneously with the first video information stream, the transmitted second video information stream corresponding to the video channel; and,
transmit information of access point timing for at least one of the first video information stream and the second video information stream, said information of access point timing indicative of in which one of the at least first video information stream and second video information stream the next access point will arrive.

25. The method of claim 12, wherein the information of access point timing comprises information indicating expected time of access point arrival.

26. The method of claim 12, wherein the information of access point timing comprises information indicating which of at least the first video information stream and the second video information stream is expected to provide the next access point.

27. The system of claim 24, wherein the information of access point timing comprises information indicating expected time of access point arrival.

28. The system of claim 24, wherein the information of access point timing comprises information indicating which of at least the first video information stream and the second video information stream is expected to provide the next access point.

* * * * *

UNITED STATES PATENT AND TRADEMARK OFFICE
CERTIFICATE OF CORRECTION

PATENT NO. : 7,610,603 B2  Page 1 of 1
APPLICATION NO. : 11/038728
DATED : October 27, 2009
INVENTOR(S) : Alexander G. MacInnis It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1244 days.

Signed and Sealed this

Twelfth Day of October, 2010

David J. Kappos
*Director of the United States Patent and Trademark Office*